United States Patent [19]
Lee

[11] Patent Number: 5,971,497
[45] Date of Patent: Oct. 26, 1999

[54] VACUUM CLEANER HAVING AN APPARATUS FOR FIXING WHEELS

[75] Inventor: Nam-Ho Lee, Kyunggi-Do, Rep. of Korea

[73] Assignee: Daewoo Electronics Co., Ltd., Seoul, Rep. of Korea

[21] Appl. No.: 08/984,147

[22] Filed: Dec. 3, 1997

[30] Foreign Application Priority Data

May 27, 1997 [KR] Rep. of Korea .................... 97-20906

[51] Int. Cl.⁶ .................................................. B60B 37/00
[52] U.S. Cl. .......................... 301/111; 15/327.2; 15/351; 15/412
[58] Field of Search .............................. 301/111; 15/339, 15/327.1, 327.2, 351, 412

[56] References Cited

U.S. PATENT DOCUMENTS

| | | | |
|---|---|---|---|
| 2,712,669 | 7/1955 | Frere et al. | 15/327.1 |
| 4,530,543 | 7/1985 | Keane | 15/339 |
| 4,955,669 | 9/1990 | Jankevics | 301/111 |
| 5,222,786 | 6/1993 | Sovis et al. | 301/111 |
| 5,283,939 | 2/1994 | Saunders et al. | 15/327.1 |
| 5,528,794 | 6/1996 | Tomasiak | 15/327.1 |

Primary Examiner—D. Glenn Dayoan
Assistant Examiner—Long Bao Nguyen
Attorney, Agent, or Firm—Jacobson, Price, Holman & Stern, PLLC

[57] ABSTRACT

The vacuum cleaner has a hollow first fixing member formed together with a body, and a second fixing member assembled with the first fixing member. The first and the second fixing members are formed with a first and a second ribs respectively. The first and the second ribs form a circular-shaped supporting rib part when the first and the second fixing members are assembled with each other. A rotational shaft of a wheel is inserted into the supporting rib part to be assembled therewith. Thus a port for fixing the wheel need not be formed on the body, and the air drawn into the body is not discharged through such a port. Further, since the rotational shaft does not protrude into the body, it is easier to install components in the body and to disassemble the wheel from the body.

3 Claims, 5 Drawing Sheets

VACUUM CLEANER HAVING AN APPARATUS FOR FIXING WHEELS

BACKGROUND OF THE INVENTION

1. Field of the Invention

The present invention relates to a vacuum cleaner having an apparatus for affixing vacuum cleaner wheels, and more particularly, to a vacuum cleaner having an apparatus for affixing vacuum cleaner wheels which prevents insertion of a rotational shaft of the wheel installed at a body into the body.

2. Prior Art

A general vacuum cleaner for drawing air to clean has a construction as shown in FIG. 1. In FIG. 1, the vacuum cleaner 100 comprises a body 112 having a dirt collecting chamber and a driving room to accommodate mechanical devices, a pair of wheels for moving the body 112, a handle 115 having a switch 114 for controlling drawing power, a flexible suction pipe 117 connected with the handle 115 and the body 112, an extention pipe 116 extended from the handle 115, and a brush installed at the free end of the extention pipe 116.

The vacuum cleaner 100 having such a constitution draws air containing dirt and impurities by the driving force of a motor in the body 112 through and the with the help of brush 113. The dirt in the drawn air is filtered by a filter installed in the dirt collecting chamber, and then the clean air is discharged from the vacuum cleaner 100.

The wheel 120 is installed on the body 112 as shown in FIG. 2. As shown in FIG. 2, the wheel 120 has a rotational shaft 124 in the central part thereof, and at the end of the rotational shaft 124 is formed a hooking rib 122 along a periphery thereof. A port 112a for assembling the wheel 120 is formed at the side 112 of the body 112, and a circular rib 121 for supporting the rotational shaft 124 of the wheel 120 is protruded outward around the port 112a.

When the rotational shaft 124 of the wheel 120 is inserted into the port 112a through the supporting rib 121, the wheel 120 become affixed to the body 112. The rotational shaft 124 is supported by the supporting rib 121, and the detachment of the rotational shaft 124 from the port 112a is prevented by the hooking rib 122.

However, the conventional vacuum cleaner 100 having such a constitution has the problem that, since the port 112a for fixing the wheel 120 pierces at the side of the body 112 and the rotational shaft 124 is inserted into the port 112a, a fine gap is formed between the port 112a and the rotational shaft 124. Since the air drawn by the strong power of a fan motor is discharged out through the gap during the operation of the vacuum cleaner 100, the air which is not filtered is discharged out. Therefore, the cleaning efficiency of the vacuum cleaner 100 is reduced.

Moreover, since the hooking rib 122 protrudes inside the body 112, it becomes more difficult to install other components inside the body such as a cord reel assembly. Also, if the wheel 120 needs to be exchanged with a new one or to be repaired, the detachment of the wheel 120 from the port 112a is not easy.

SUMMARY OF THE INVENTION

The present invention has been proposed to overcome the above-described problems in the prior art, and accordingly, it is an object of the present invention to provide a vacuum cleaner which prevents the discharge of the air drawn in the body through the port for affixing the wheel, protrusion of the rotational shaft of the wheel inside the body.

To achieve the above object, the present invention provides a vacuum cleaner comprising: a body for accommodating mechanical devices; a first fixing member being mounted at a side of said body, said first fixing member having a shape of a hollow plate, said first fixing member of which a side is caved along a planar direction thereof to be substantially U-shaped, wherein a first rib which is substantially U-shaped protrudes outward at an edge of a caved part; a second fixing member having a pair of arms protruding from a side thereof in parallel with each other, said arms being assembled by insertion with a hollow part of said first fixing member, wherein a second rib which is substantially semicircle-shaped protrudes outward, said second rib for forming a substantially circle-shaped supporting rib part together with said first rib by an assembly with said first fixing member; a wheel having a rotational shaft being inserted into said supporting rib part, said rotational shaft being supported by said supporting rib part; and a hooking rib protruding at an end of said rotational shaft, said hooking rib being placed in said hollow part of said first fixing member when said rotational shaft is inserted into said supporting rib part, whereby detachment of said rotational shaft from said supporting rib part is prevented.

Said first fixing member is assembled with said second fixing member by an assembly of hooking protrusions protruding respectively at ends of said arms and hooking holes formed at said first fixing member.

Further, it is preferable that said first fixing member and said body are formed together in a body.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Figure 1:
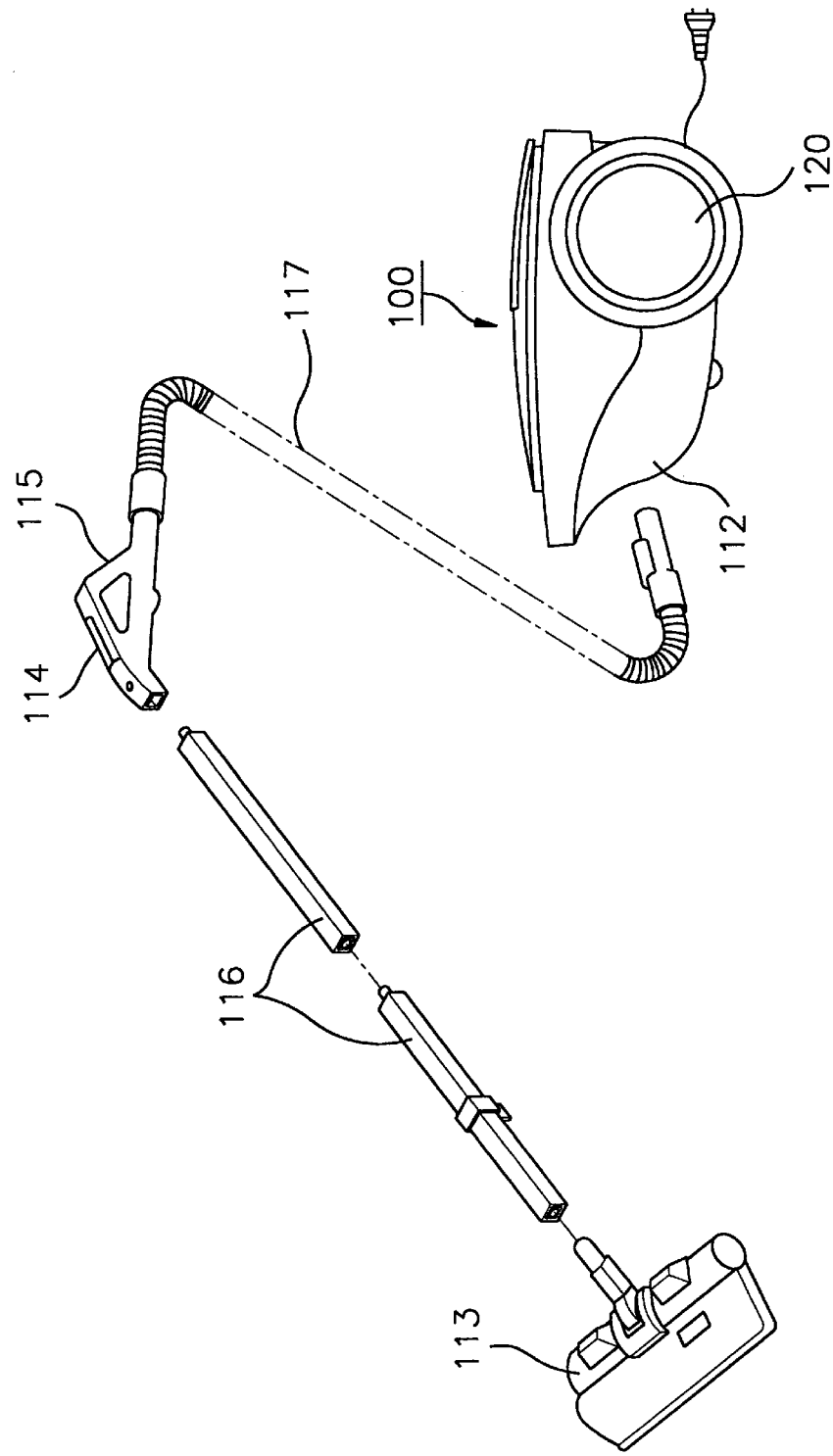
FIG. 1 is a perspective view of a general vacuum cleaner.

Hereinafter, the present invention will be described in detail with reference to the drawings. The same parts with the parts of the conventional vacuum cleaner are illustrated with the same reference numerals.

Figure 3:
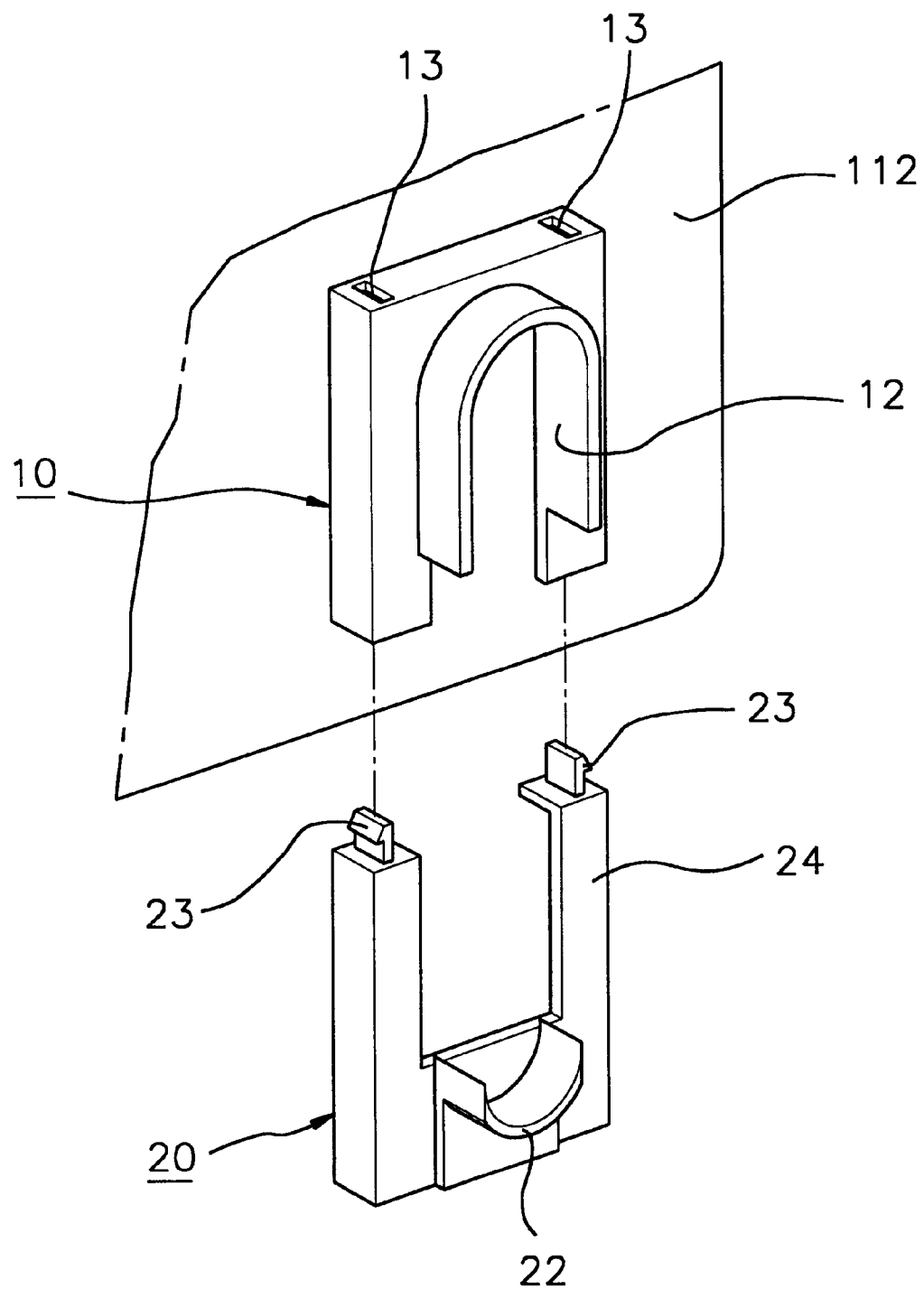
FIG. 3 is a partial perspective view of a vacuum cleaner according to the present invention.
Figure 4:
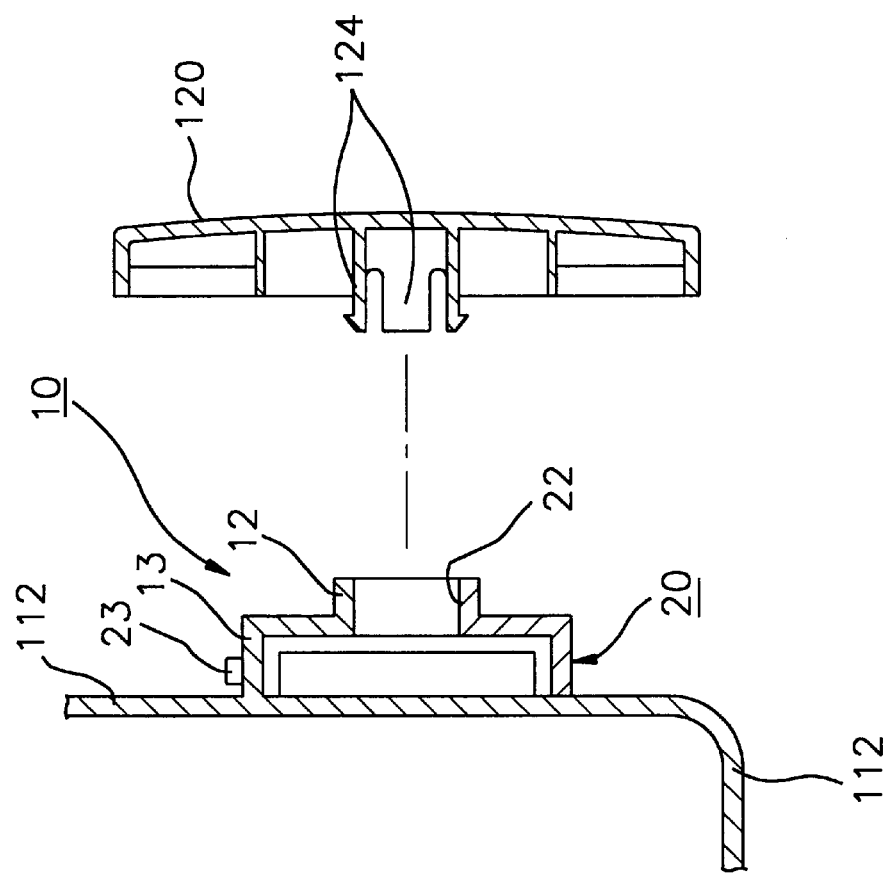
FIG. 4 is a partial elevational sectional view of the vacuum cleaner according to the present invention.
Figure 5:
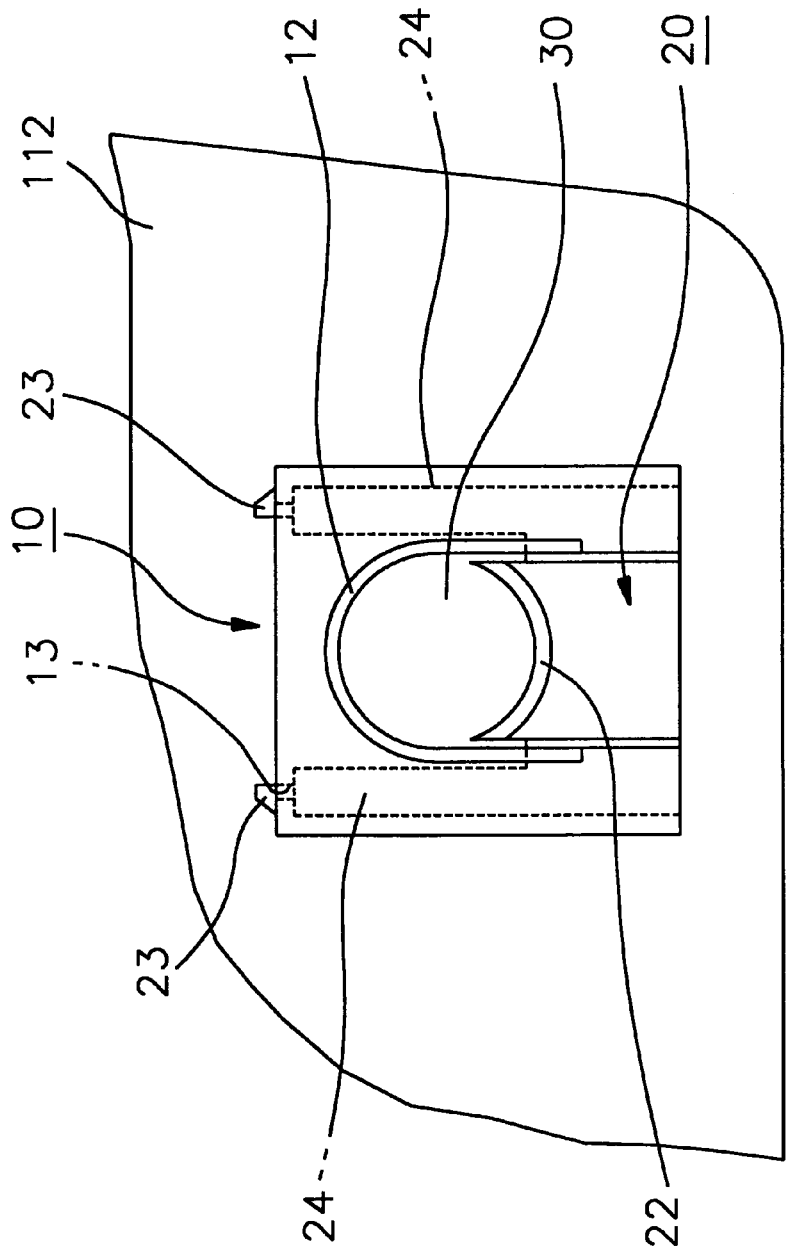
FIG. 5 is a side sectional view of FIG. 4.

FIG. 3 through FIG. 5 show a vacuum cleaner according to the present invention. As shown in the figures, the vacuum cleaner according to the present invention comprises a first fixing member 10 and a second fixing member 20.

The first fixing member 10 is installed at the side of the body 112, and preferably is manufactured by one member together with the body 112 of the vacuum cleaner. The first fixing member 10 is formed by a hollow plate member.

One side of the fixing member 10 is caved along the planar direction thereof to be substantially U-shaped, and a first rib 12 which is substantially U-shaped is protruded outward at an edge part of the caved part thereof. A pair of hooking holes 13 are formed at the upper side of the first fixing member 10.

The second fixing member 20 has a pair of arms 24 protruding from the upper side thereof in parallel with each other. The first fixing member 10 and the second fixing member 20 are assembled with each other by the insertion of the arms 24 into the hollow part of the first fixing member 10. The second fixing member 20 is formed with a second rib 22 which is substantially semicircle-shaped. The second rib 22 forms a circle-shaped supporting rib part together with the first rib 12 when the second fixing member 20 is assembled with the first fixing member 10.

At the end of each arm 24 is protruded a hooking protrusion 23. When the arms 24 are inserted into the hollow part of the first fixing member 10, the hooking protrusions 23 are inserted into the hooking holes 13 respectively. The second fixing member 20 is assembled with the first fixing member 10 by such an assembly.

Figure 2:
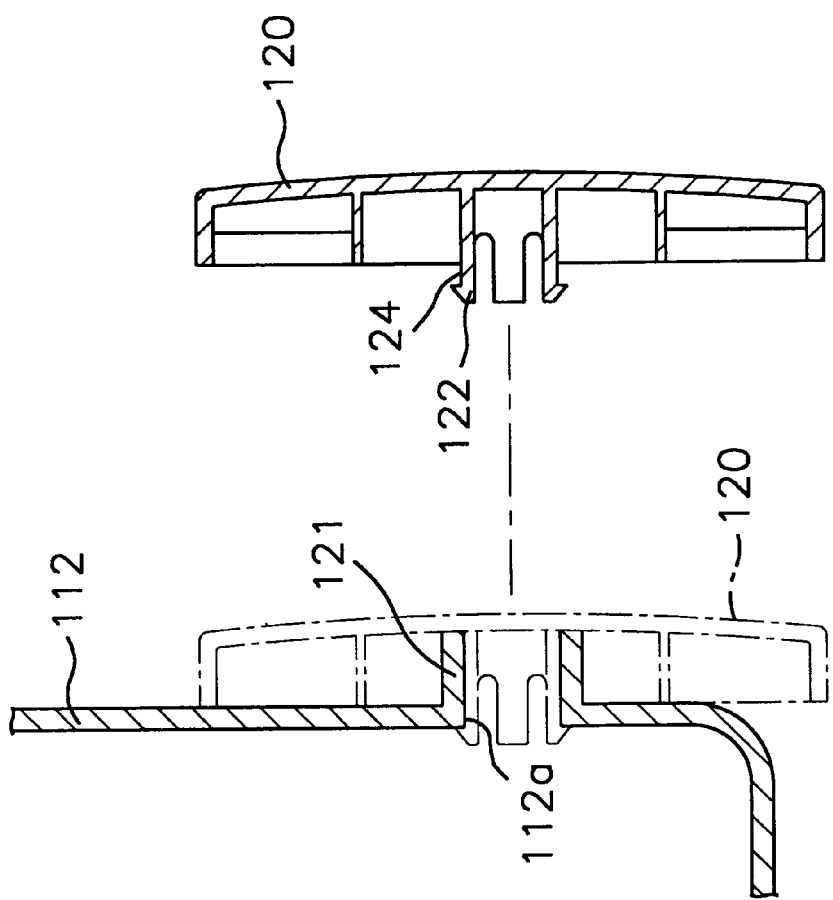
FIG. 2 is a partial sectional view of a vacuum cleaner which shows a wheel fixing apparatus according to the conventional art.

The wheel 120 has a rotational shaft 124 as the conventional vacuum cleaner illustrated in FIG. 2, and at the end of the rotational shaft 12 is formed with a hooking rib 122 along the periphery thereof. The rotational shaft 124 is supported by the supporting rib part formed by the first rib 12 and the second rib 22. The hooking rib 122 is placed in the hollow part of the first fixing member 10 when the rotational shaft 124 is inserted into the supporting rib part, whereby the detachment of the rotational shaft 124 from the supporting rib part is prevented.

The vacuum cleaner according to the present invention is put together in the following steps: assembling the second fixing member 20 with the first fixing member 10 which is formed by one member with the body 112, and assembling the wheel 120 with the supporting rib part. In more detail, when the arms 24 of the second fixing member 20 are inserted into the hollow part of the first fixing member 10, the hooking protrusion 23 is inserted into the hooking holes 13, whereby the first and the second fixing members 10, 20 are assembled with each other. Then, the rotational shaft 124 of the wheel 120 is inserted into the supporting rib part which is formed by the first and the second ribs 12, 22, whereby the hooking rib 122 is inserted into the inner space of the first fixing member 10. Then the detachment of the wheel 120 is prevented by the hooking rib 122.

According to such a construction, there is no gap on the body 112 for air to escape since the port 112a is not formed on the body 112 as in the conventional vacuum cleaner shown is FIG. 2. Thus the drawn air is not discharged without being filtered.

Furthermore, since the end of the rotational shaft 124 does not protrude into the body 112, it is easier to install components such as the cord reel assembly inside the body 112.

If a user wants to detach the wheel 120 from the body 112, he manually unhooks the hooking protrusions 23 from the hooking holes 13 to disassemble the second fixing member 20 from the first hooking member 10. Therefore, it is easy to detach the wheel 120 in order to exchange the wheel 120 with a new one or to repair it.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. A vacuum cleaner comprising:
    a body for accommodating mechanical devices;
    a first fixing member being mounted at one side of said body, said first fixing member having a hollow part, said first fixing member of which said one side forms a caved part along a planar direction thereof to be substantially U-shaped, a first rib which is substantially U-shaped protrudes outward at an edge of said caved part;
    a second fixing member having a pair of arms protruding from a side of the second fixing member in parallel with each other, said arms being assembled by insertion with said hollow part of said first fixing member, a second rib which is substantially semicircle-shaped protrudes, said second rib for forming a substantially circle-shaped supporting rib part together with said first rib by an assembly with said first fixing member;
    a wheel having a rotational shaft being inserted into said supporting rib part, said rotational shaft supported by said supporting rib part; and
    a hooking rib protruding at one end of said rotational shaft, said hooking rib being placed in said hollow part of said first fixing member when said rotational shaft is inserted into said supporting rib part, whereby detachment of said rotational shaft from said supporting rib part is prevented.

2. The vacuum cleaner as claimed in claim 1, wherein said first fixing member is assembled with said second fixing member by an assembly of hooking protrusions protruding respectively at both ends of said arms and hooking holes formed at said first fixing member.

3. The vacuum cleaner as claimed in claim 1, wherein said first fixing member and said body are formed together in a body.

* * * * *